J. L. UNDERWOOD.
PEANUT-THRASHERS.

No. 194,195. Patented Aug. 14, 1877.

UNITED STATES PATENT OFFICE.

JOHN LEE UNDERWOOD, OF SMITHFIELD, VIRGINIA.

IMPROVEMENT IN PEA-NUT THRASHERS.

Specification forming part of Letters Patent No. 194,195, dated August 14, 1877; application filed March 24, 1877.

*To all whom it may concern:*

Figure 1:
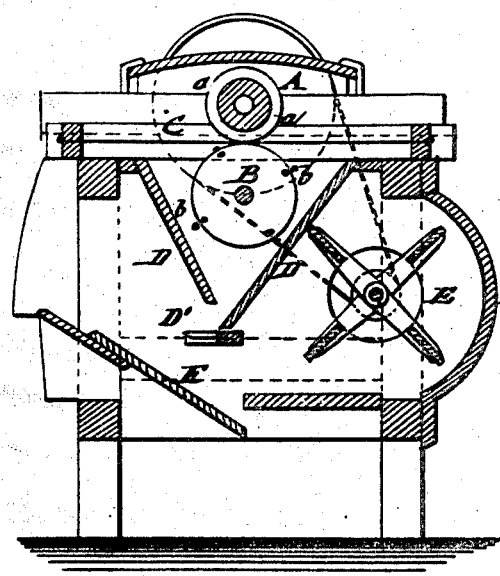
Figure 2:
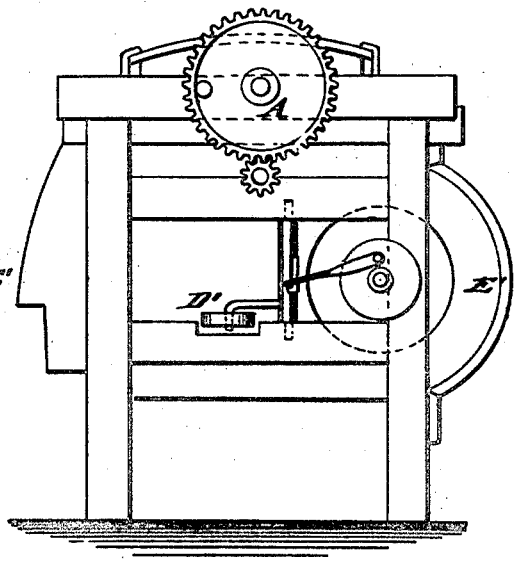
Figure 3:
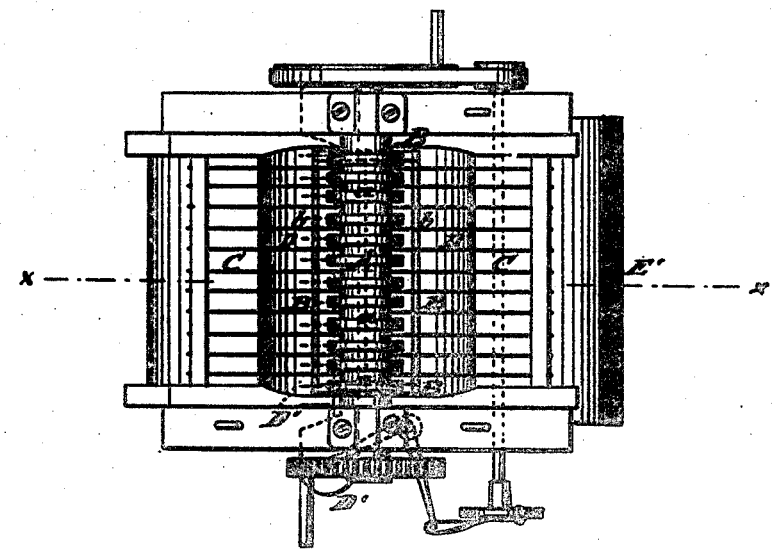

Be it known that I, JOHN L. UNDERWOOD, of Smithfield, in the county of Isle of Wight and State of Virginia, have invented a new and Improved Pea-Nut Picker and Separator, of which the following is a specification:

In the accompanying drawing, Figure 1 represents a vertical longitudinal section of my improved pea-nut picker and separator on line $xx$, Fig. 3. Fig. 2 is a side elevation, and Fig. 3 a top view, of the same.

Similar letters of reference indicate corresponding parts.

The object of this invention is to provide for pea-nut growers an improved machine by which the pea-nuts may be picked off the vines without tearing the vines to pieces, so that the latter may be used in more advantageous manner for feeding purposes. The pea-nuts and vines are at the same time cleared of any adhering dirt, which is separated with the lighter pea-nuts by the machine from the heavier ones.

In the drawing, A represents the top roller; B, the reel arranged below the same, and C the horizontal wire-frame, whose wires are stretched parallel to, and at suitable distance from, each other, in longitudinal direction, between the annular sections or ribs $a$ of roller A.

The roller and reel turn in bearings of a suitable frame, and are revolved by a suitable crank-shaft and gear, and by hand or other power.

The pea-nut vines are fed along the top wire-frame C to the action of the ribbed roller A, and are drawn through between roller and frame, so as to be exposed to the clearing action of the rapidly-revolving reel without tearing the vines to pieces. The reel B is arranged parallel to, and beneath, the ribbed roller, and provided with a number of wires, $b$, that are stretched in pairs from one head to the other, as shown in Figs. 1 and 3, said wires coming against the wires C in the rotation of the reel, and taking hold of the pea-nuts and removing them from the vines, while they are prevented from being drawn down or torn by the retaining action of the longitudinal wire frame and ribbed roller. The pease are dropped from the reel onto a hopper, D, and discharged through the mouth of the same on a horizontal and laterally-reciprocating finger-bar, D', on which the pea-nuts are exposed to the powerful blast of a fan, E, revolving in a casing, E', of the supporting-frame. The fan and finger-bar are operated by suitable connecting-gear from the crank-shaft, so as to be worked simultaneously with the same. The lighter pea-nuts, small pieces of vine, dirt, and other impurities are separated by the fan-blast from the heavier pea-nuts, which are dropped on an inclined plane, F, and discharged into a receiving-receptacle below the machine, thus picking the pea-nuts without tearing the vines, and without crushing the pease, in a rapid, thorough, and economical manner.

Having thus described my invention, I claim as new and desire to secure by Letters Patent—

The combination, with the annularly-grooved feed-roller and the reel arranged parallel to and below it, of the frame of stretched wires passing between the ribs of the roller, as and for the purpose specified.

JOHN LEE UNDERWOOD.

Witnesses:
E. F. ATKINSON,
B. W. L. GOULD.